Nov. 8, 1966
B. S. WILDI
3,284,418
POLYMERS OF HETEROCYCLIC NITROGEN COMPOUNDS
Filed Feb. 1, 1963
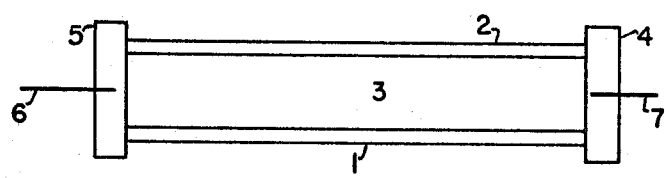
INVENTOR.
BERNARD S. WILDI
BY *Mary B. Moshier*
ATTORNEY 3,284,418
POLYMERS OF HETEROCYCLIC NITROGEN
COMPOUNDS
Bernard S. Wildi, Kirkwood, Mo., assignor to Monsanto
Research Corporation, St. Louis, Mo., a corporation of
Delaware
Filed Feb. 1, 1963, Ser. No. 255,483
3 Claims. (Cl. 260—78.4)

This invention relates to polymers of heterocyclic nitrogen compounds and more particularly provides new and valuable polymeric product consisting essentially of a combination of 2,4,6-tricyano-s-triazine and a heterocyclic nitrogen compound, the method of preparing said polymeric product and thermoregulating devices wherein the polymeric product is employed as electric current resistor.

Thermistors are electric current resisting elements made of a semi-conducting material which exhibits a high negative temperature coefficient of resistivity. It is well known in the art to employ certain inorganic materials as thermistor elements, e.g., the oxides of nickel, copper and zinc have been used for this purpose. However, few, if any, organic materials have been previously used for this purpose. For many reasons, e.g., for easy fabrication of the thermistor component and for better control of the manufacturing process to obtain reproducibility insofar as sensitivity and stability is controlled, organic materials are preferable.

Accordingly, an object of the present invention is the provision of organic compounds having semiconducting property. Another object is the provision of an organic compound having a high negative temperature coefficient of resistivity to electric current. Still another object of the invention is the production of polymeric heterocyclic nitrogen compounds. A further object is the provision of polymers from 2,4,6-cyano-s-triazine and quinoline. A very important object is the provision of organic thermistors. A further object is the provision of new and useful electrical current regulating devices. Another object of this invention is to provide new and useful thermoregulating devices. These and other objects of the invention will become apparent as the detailed description of the invention proceeds.

It has been found that by heating 2,4,6-tricyano-s-triazine with quinoline, there is formed a thermally stable solid polymer consisting essentially of a combination of the triazine and the quinoline in substantially equimolar proportions. Although I do not know the mechanism through which the polymerization reaction proceeds, it is probable that the presence of quinoline in the polymer stems from nucleophilic attack of the quinoline nucleus on a triazine carbon, resulting in the formation of a polymerizable quaternary compound of the formula:

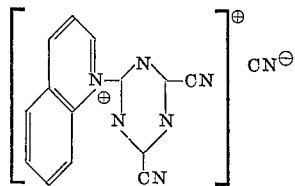

However, it is not definitely known whether the quinoline is present in the polymer in a reacted form, for example, such as is shown above, or in a strongly adsorbed form. Elemental analysis shows only that the polymer corresponds to substantially equimolar proportions of the triazine and the quinoline.

Formation of polymer from the 2,4,6-tricyano-s-triazine and the quinoline takes place readily by simply heating them together at temperatures of from, say, 60° C. to 280° C., and preferably at 100° C. to 260° C. The triazine is readily soluble in quinoline, and advantageously the polymer-forming reaction is conducted at the refluxing temperature of the solution. Since the solvent, i.e., the quinoline, participates in formation of the polymer, it is gradually depleted as polymer is formed, and when the triazine and quinoline are employed in equimolar proportions, the entire solution is converted into solid polymer. Formation of the polymer involves participation of one mole of the triazine with one mole of the quinoline; hence the two are advantageously employed in such stoichiometric proportions, particularly when the polymerization is conducted in a mold. However, for general purposes, easy manipulation is obtained by using either an excess of the quinoline to serve as diluent, or an extraneous, inert organic liquid solvent or diluent, e.g., a paraffinic or aromatic hydrocarbon such as benzene, xylene or gasoline or an ether such as dioxane or diglyme. The nature of the inert solvent or diluent will have a bearing, of course, on the temperature at which the polymerization is conducted. Although polymerization rate is greater at the higher temperatures, polymerization does occur at temperatures permitting the use of the compartively low-boiling solvents, e.g., hexane, benzene, diisopropyl ether, etc.

When the polymerization is conducted in the presence of excess of quinoline as diluent or in the presence of an extraneous diluent, the solid polymer is recovered from the reaction mixture by separation procedures customarily employed in the art, e.g., by distilling off the diluent, filtering, decanting, etc. The polymer is insoluble in hot water and in the hot, lower alkanols and, in order to rid it of any residual triazine or quinoline or a non-readily volatilized diluent, it may be washed and dried either before or after comminuting to granular or powdered polymer.

The presently provided polymer is a stable, high-melting solid material which finds application for a variety of industrial purposes; but owing to the unique property of the polymer to resist the flow of electrical current at low temperatures while permitting current flow at higher temperatures, the polymer is particularly suitable for the manufacture of thermistors designed for use in measurement and control apparatus, e.g., temperature and volume regulating means, oscillators, high frequency power meters, etc.

One of the fundamental differences between most inorganic materials, e.g., metals and semiconductors is the effect of temperature on resistivity. Metals show a slight increase in resistivity with increasing temperature, while semiconductors show an inverse effect of much greater magnitude. The resistivity of inorganic semiconductors follow the relationship $\rho = \rho_0 \exp.-\Delta E/kT$ where $\rho$ is the resistivity, $\rho_0$ a constant, $\Delta E$ the energy gap between the valence band and conduction band and $kT$ the product of the Boltzmann constant and absolute temperature. If one plots the log of the resistivity $(\rho)$ versus the reciprocal of the absolute temperature $(1/T)$, a straight line is obtained. The slope of this line is $(\Delta E/k)$ and the intercept on the $1/T$ axis is log $\rho_0$. Experimentally obtained data obtained with inorganic semiconductors fit the Arrhenius equation. The presently provided polymer is a resistor whose temperature variation of resistance is large enough for useful application. It shows the same behavior as do the inorganic thermistors, with increasing temperature resulting in an exponentially decreasing resistivity.

The invention is further illustrated by, but not limited to the following examples.

*Example 1*

To 109 parts by weight of quinoline there was added 9 parts by weight of 2,4,6-tricyano-s-triazine. The latter dissolved almost immediately, and within a few minutes the solution had changed from orange to black. It was mantle-heated to reflux, and after one hour of heating the reaction mixture had set up to a solid, with only a very small amount of residual quinoline refluxing. The solid was cooled, broken up, poured into water, and filtered. After washing the filtered solids with hot ethanol, the washed material was dried to constant weight at 110° C./ 50/60 mm. There was thus obtained 11.5 g. of a dark solid polymer, not melting at 262° C., and analyzing 33.98% nitrogen, as compared to 34.41%, the calculated nitrogen value for a polymer having the empirical formula $(C_{15}H_7N_7)_n$ and representing one mole of 2,4,6-tricyano-s-triazine $(C_6N_6)$ in combination with one mole of quinoline $(C_9H_7N)$. The calculated value for homopolymeric 2,4,6-tricyano-s-triazine $(C_6N_6)_n$ is 53.84. The presently obtained polymeric product thus consists essentially of a combination of substantially equimolar proportions of said tricyanotriazine and quinoline.

*Example 2*

Testing of the semiconductor properties of the polymer obtained in Example 1 was conducted as follows:

The temperature resistivity measurements were made in a ¾″ diameter cylindrical quartz cell, the thickness of which could be varied from 0.7 to 5 mm. The quartz cell was fitted with a heater, platinum electrodes and a thermocouple. The cell was covered by a bell jar connected to a gas inlet and vacuum system. The sample of said polymer in powdered form was placed in the cell holder, and the electrodes attached under a constant spring tension. The bell jar system containing the sample in the cell was evacuated. The resistivities were determined with a megaohm bridge. Nine determinations were made in a cooling cycle within a temperature range of 258° C. to 460° C. Plotting of the log resistivity-reciprocal temperature data gave a straight line curve, with a resistivity of $3.46 \times 10^8$ ohm-cm., at one temperature extreme and a resistivity of $2.77 \times 10^{11}$ ohm-cm. at the other. The log of the resistivity was plotted against $1000/T$ and from this the energy gap $\Delta E$ was arrived at by the Arrhenius equation to be $\Delta E = 1.208$. The intercept $\rho_0$ value was found to be $7.79 \times 10$ ohm-cm. Also conducted were nine determinations in a heating cycle within a temperature range of 23° C. to 250° C. Plotting of the log resistivity-reciprocal temperature data gave a straight line curve with a resistivity of $1.5 \times 10^{12}$ ohm-cm. at the low temperature extreme. The energy gap $\Delta E$ (arrived at by the Arrhenius equation from log of the resistivity plotted against $1000/T$) was determined to be 1.113. The intercept $\rho_0$ value was found to be $5.08 \times 10^3$ ohm-cm.

The invention provides thermistors comprising the tricyanotriazine-quinoline polymer in contact with a pair of electric current conductors. Thermistors comprising the present polymer may be made by forming a compact, rigid tablet or wafer of the polymer, volatilizing a metal, e.g., gold, upon portions of the surface thereof to serve as contact, and positioning wire leads therein. An alternative thermistor construction comprises a bead of the polymer held between two wires which serve as leads and, if desired, sealed in glass or other siliceous material. The granular or powdered tricyanotriazine-quinoline polymer may be melted at high temperatures and fused to electrode tips to provide a very easily manufactured thermistor. Also, pills of the polymer may be formed, covered with a silver-base glaze, and baked or covered with a silicon-base varnish after the leads are soldered on the coated pills. The presently provided polymer compounds may likewise be encapsulated in a plastic film, e.g., a film of polyethylene, polyvinyl chloride, nylon or tetrafluoroethylene polymer and provided with circuit means intimately surrounded by the polymer and projecting externally. A laminate thermistor comprising the tricyanotriazine polymer is shown in FIGURE 1, wherein numerals 1 and 2 depict ceramic or glass sheets, numeral 3 depicts compacted 2,4,6-tricyano-s-triazine-quinoline polymer, numerals 4 and 5 are metal contacts which may be of silver or gold, and numerals 6 and 7 are wire leads. Thermistors comprising said polymer are also easily constructed by placing the granulated or powdered polymer in a hollow rigid casing which may be of ceramic or glass and through which leads are interposed and placed in intimate contact with the presently provided semiconducting materials.

In manufacture of thermistors, the presently provided polymer may be used alone as the only semiconducting component or it may be admixed with known materials which exhibit a high negative temperature coefficient of resistivity. Also, the polymer may be mixed and pressed with sodium silicate or combined with resinous materials, especially the polymeric silicones, to give rigid structures in wafer, rod, or tablet form.

What I claim is:

1. The method which comprises heating 2,4,6-tricyano-s-triazine with quinoline to obtain a thermally stable, solid polymer having semi-conducting properties and consisting essentially of said triazine and quinoline in substantially equimolar proportions.

2. The polymer produced by the method defined in claim 1.

3. A thermistor comprising the polymer obtained by the method defined in claim 2 and, in electrical contact with said polymer, a pair of electricity-conducting wire leads.

References Cited by the Examiner
UNITED STATES PATENTS
2,846,559  8/1958  Rosenberg _____ 252—500

JOSEPH L. SCHOFER, *Primary Examiner.*

L. WOLF, *Assistant Examiner.*